May 6, 1941.  J. C. GALE  2,241,300
PHOTOGRAPHIC ACCESSORY
Filed Sept. 3, 1940
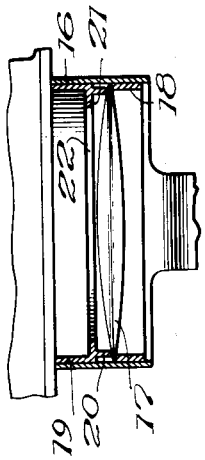
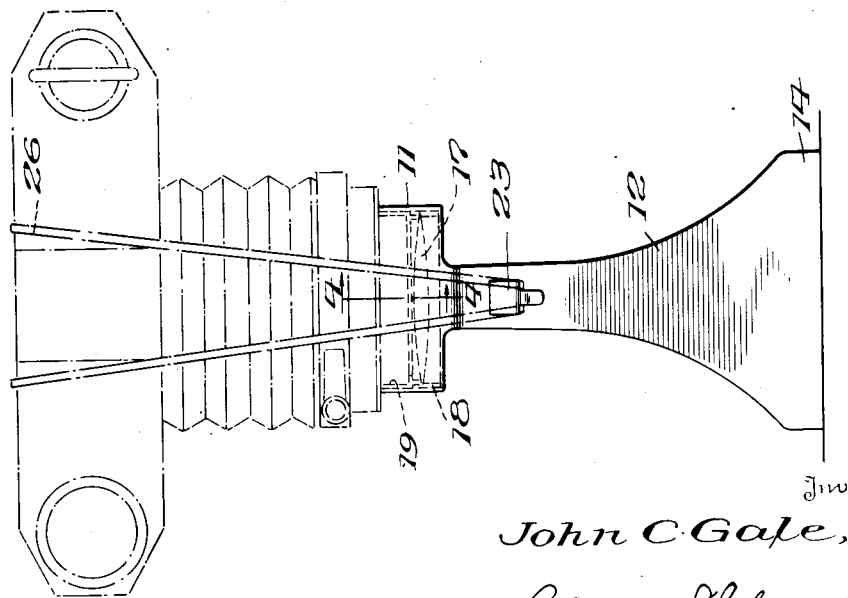
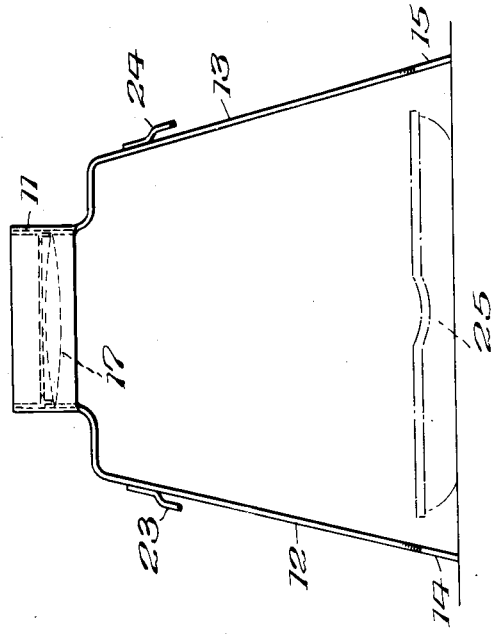
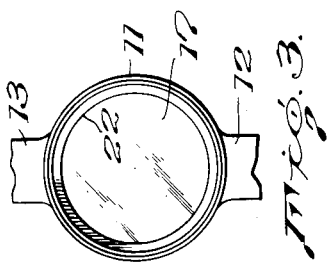
Inventor
John C. Gale,
By Church & Church
His Attorneys Patented May 6, 1941

2,241,300

UNITED STATES PATENT OFFICE 2,241,300

PHOTOGRAPHIC ACCESSORY

John C. Gale, Omaha, Nebr.

Application September 3, 1940, Serial No. 355,241

3 Claims. (Cl. 88—24)

This invention relates to photographic accessories, and particularly to an accessory for use with many of the cameras now on the market to obtain a greatly enlarged picture.

One of the objects of the invention is to provide such a device which is readily transported, and is usable with any one of numerous cameras now available.

A further object is to provide such a device which can be used without any adjustment of the device itself or any complicated adjustment of the camera, and which hence can be used by one having only the most rudimentary knowledge of photography.

A still further object is to provide such a device by which, with any given camera, pictures can be obtained which will always represent a fixed ratio of enlargement.

Further objects of the invention, and the novel features of the construction and the use of a structure embodying the invention will be apparent from the following specification when read with reference to the accompanying drawing, in which:

Figure 1 is a view in front elevation of a structure embodying the invention, a camera of conventional form being shown in dotted lines as supported on the structure in position for use;

Fig. 2 is a view in side elevation of the accessory structure shown in Fig. 1;

Fig. 3 is a fragmentary view in plan of the top portion of the structure shown in Figs. 1 and 2; and Fig. 4 is an enlarged fragmentary view in vertical section taken on the line 4—4 of Fig. 1.

In general, the invention comprises a device for supporting any one of many cameras, regardless of its particular size or shape, at a fixed distance above a supporting plane, while permitting light to reach the object to be photographed which is located in such plane, and which device comprises an enlarging lens fixedly mounted therein at a distance from said plane equal to its focal distance and close to the lens of the supported camera.

In the embodiment of the invention shown in the drawing a tubular head 11 is supported by rigid legs 12 and 13 which extend laterally a short distance in opposite directions from the head and then downwardly, preferably diverging slightly as shown. Each of the legs 12 and 13 is preferably widened at its base to provide wide ends 14 and 15, respectively, to increase the stability of the support, it being understood that the ends 14 and 15 define a plane that is parallel to the plane defined by the top peripheral edge of the head 11 so that when the structure is placed upon a table top or other flat surface, a camera placed upon the head 11 will be supported in stable equilibrium with the axis of its lens perpendicular to the flat surface upon which it is supported.

The head 11 is preferably circular in shape, as shown, but it will be understood that such shape, although convenient, is not essential and that it may be rectangular or of any other shape so long as its top edge defines a supporting plane for engagement with the flat front face of the camera, or its lens mounting, in an area surrounding the lens opening of the camera. As shown best in Fig. 4, the peripheral wall 16 of the head 11 may be formed of sheet metal, or other suitable material, and integral with the legs 12 and 13, if desired. Within the head 11 a convex lens 17 is rigidly mounted, as for instance between a lower ring 18 which is mounted, with a press fit, in the bottom portion of the head, and a top ring 19 press fitted in the top portion of the head. As shown, the top ring 19 has a depending annular flange 20 offset slightly inwardly from the body of the ring and engaging the upper surface of the lens 17 at a slight distance from its edge, and an inwardly-directed flange 21 is preferably provided on the top ring 19 to define a circular opening 22 of a diameter slightly less than that of the lens.

Hook tabs 23 and 24 are secured, by welding or by any other suitable means, to the outer faces of the legs 12 and 13, respectively, with which tabs a securing member, such as a rubber band, string, or similar flexible means, may be engaged as indicated at 26 in dotted lines in Fig. 1, for holding a camera, regardless of its size or shape, to the support structure.

The legs 12 and 13 are of such length that their lower edges define a plane at a distance from the lens 17 that is equal to the focal distance of the lens. The spacing and configuration of the legs are such that while they afford stability of support they also permit a maximum of light to reach the object to be photographed, and also permit a relatively large tray, or dish, as indicated at 25 in Fig. 1, to be placed between them. It will be understood that the object to be photographed is usually located upon the flat surface upon which the device as a whole is supported, but such object may be placed in the bottom of a tray or dish such as that indicated. In place of a dish or tray 25 an opaque mask may be used, having an opening in it which discloses the exact area to be photographed.

In use, the focus of the camera is set at "infinity," or a camera having a "universal focus" may be used, and any suitable time of exposure may be used. Excellent results have been obtained by using an f.8 diaphragm opening with an exposure of 1/25 of a second, when the object is illuminated by an ordinary flash-light held about two inches from the object.

The device has been found to be particularly efficient in police work for obtaining enlarged photographs of signatures, fingerprints, buttons, the weave of cloth, etc., particularly because of its low cost and ready portability, and because it can be used with almost any one of the cameras available on the market and by one having only the slightest knowledge of photography, to obtain pictures of a standard enlargement ratio.

It will be understood that changes may be made in the dimensions of the parts and details of construction, such as the means for holding the lens in fixed relation, within the scope of the invention, which is defined in the following claims.

What is claimed is:

1. A supporting device for use with a camera for taking enlarged photographs, comprising a tubular head portion the upper surface of which defines a plane, depending leg portions each secured at one end to said head portion, the edges of one of said leg portions being spaced from the edges of the other of said leg portions to define opposed openings, the free ends of said leg portions defining a plane parallel to that defined by the upper surface of said head portion, and a convex lens fixedly mounted in said head portion with its axis perpendicular to said planes.

2. A supporting device for use with a camera for taking enlarged photographs, comprising a tubular head portion having an annular flange at its top the upper edge of which defines a plane, depending leg portions each rigidly secured at one end to said head portion and being otherwise disconnected, said leg portions being widened at their free ends to define a plane parallel to that defined by the upper edge of the flange of the head portion, a lens fixedly mounted in said head portion with its axis perpendicular to said planes and at a distance substantially equal to its focal length from the plane defined by the free ends of said leg portions.

3. A supporting device for use with a camera for taking enlarged photographs, comprising an annular head portion and a pair of diverging leg portions integral with said head portion and widened at their free ends, the edges of one of said leg portions being spaced from the edges of the other of said leg portions to define opposed openings, the upper edge of said annular head portion and the lower edges of said leg portions, respectively, defining parallel planes, and a lens fixedly mounted in said head portion adjacent its top edge with its axis perpendicular to said planes and at a distance substantially equal to its focal length from the plane defined by the lower edges of said leg portions.

JOHN C. GALE.